(12) United States Patent
Bair

(10) Patent No.: US 9,894,494 B2
(45) Date of Patent: *Feb. 13, 2018

(54) SYSTEM, APPARATUS AND METHOD FOR CONFIGURING A WIRELESS SOUND REINFORCEMENT SYSTEM

(71) Applicant: Zach Bair, Memphis, TN (US)

(72) Inventor: Zach Bair, Memphis, TN (US)

( * ) Notice: Subject to any disclaimer, the term of this patent is extended or adjusted under 35 U.S.C. 154(b) by 324 days.

This patent is subject to a terminal disclaimer.

(21) Appl. No.: 14/852,689

(22) Filed: Sep. 14, 2015

(65) Prior Publication Data

US 2016/0007168 A1 Jan. 7, 2016
US 2016/0381515 A9 Dec. 29, 2016

Related U.S. Application Data

(63) Continuation of application No. 13/649,538, filed on Oct. 11, 2012, now Pat. No. 9,137,730.
(Continued)

(51) Int. Cl.
*H04H 40/00* (2009.01)
*H04W 4/06* (2009.01)
(Continued)

(52) U.S. Cl.
CPC .......... *H04W 4/06* (2013.01); *H04L 12/2838* (2013.01); *H04L 61/15* (2013.01); *H04L 61/2007* (2013.01); *H04W 40/00* (2013.01); *H04L 45/74* (2013.01); *H04L 61/2015* (2013.01); *H04L 2012/2841* (2013.01); *H04R 2420/07* (2013.01)

(58) Field of Classification Search
USPC ....................................................... 455/3.06
See application file for complete search history.

(56) References Cited

U.S. PATENT DOCUMENTS 7,443,292 B2 * 10/2008 Jensen ................... B42D 15/00
281/51
7,623,823 B2 * 11/2009 Zito ....................... G06Q 30/02
455/2.01
(Continued)

FOREIGN PATENT DOCUMENTS

EP 0 837 579 B1 3/2008

OTHER PUBLICATIONS

ISR PCT/US2012/059726 dated Mar. 25, 2013—9 pages including Written Opinion.

*Primary Examiner* — Ankur Jain
(74) *Attorney, Agent, or Firm* — Daniel J. Chalker; Edwin S. Flores; Chalker Flores, LLP

(57) ABSTRACT

A system, apparatus and method for configuring a wireless sound reinforcement system detects a controller and two or more wireless adapters using an electronic device. The controller has a plurality of input channels and output channels. Each wireless adapter is associated with an entertainment device. Channel information about each input channel and output channel is obtained from the controller. Device information is obtained from each entertainment device via the wireless adapter. A network address is assigned to each input channel, output channel and wireless adapter. Each entertainment device is mapped to at least one of the input channels and/or output channels. The device information and channel mappings for the entertainment devices are provided to the controller.

16 Claims, 4 Drawing Sheets

Related U.S. Application Data

(60) Provisional application No. 61/545,685, filed on Oct. 11, 2011.

(51) Int. Cl.
*H04W 40/00* (2009.01)
*H04L 12/28* (2006.01)
*H04L 12/741* (2013.01)
*H04L 29/12* (2006.01)

(56) References Cited

U.S. PATENT DOCUMENTS

| | | | | |
|---|---|---|---|---|
| 8,463,184 | B2* | 6/2013 | Dua | G06F 17/30058 |
| | | | | 340/10.51 |
| 8,503,340 | B1* | 8/2013 | Xu | H04W 84/12 |
| | | | | 370/310 |
| 8,532,714 | B2* | 9/2013 | Sampat | G06F 9/44526 |
| | | | | 455/3.06 |
| 2003/0074450 | A1* | 4/2003 | Kang | H04L 12/2803 |
| | | | | 709/227 |
| 2004/0147223 | A1* | 7/2004 | Cho | H04L 12/66 |
| | | | | 455/41.2 |
| 2008/0066123 | A1* | 3/2008 | Igoe | H04L 12/2809 |
| | | | | 455/41.3 |
| 2009/0199219 | A1* | 8/2009 | Rofougaran | G06F 9/441 |
| | | | | 719/330 |
| 2010/0217912 | A1* | 8/2010 | Rofougaran | H04M 1/72527 |
| | | | | 710/304 |

* cited by examiner

SYSTEM, APPARATUS AND METHOD FOR CONFIGURING A WIRELESS SOUND REINFORCEMENT SYSTEM

CROSS-REFERENCE TO RELATED APPLICATIONS

This application is a continuation application of U.S. patent application Ser. No. 13/649,538 filed Oct. 11, 2012, now U.S. Pat. No. 9,137,730, which claims priority to U.S. Provisional Application Ser. No. 61/545,685, filed Oct. 11, 2011. The entire contents of the foregoing applications are incorporated herein by reference.

FIELD OF THE INVENTION

The present invention relates generally to the field of entertainment systems and, more particularly, to a system, apparatus and method for configuring a wireless sound reinforcement system.

BACKGROUND OF THE INVENTION

Music and entertainment systems in general are mostly a tangled web of cords. For example, cords to connect guitars to amps, cords to connect speakers to sound reinforcement systems, etc. Cords are used for everything. Although there have been a number of wireless solutions over the years that free musicians from their cords, these solutions have been limited to wireless microphones and wireless guitar transmitters. These wireless devices mostly use standard UHF or VHF frequencies to transmit and receive analog data, although some of them are now starting to be digitally controlled.

A sound reinforcement system is an arrangement of microphones, electronic signal processors, amplifiers, and loudspeakers that makes live or pre-recorded sounds—usually music or speech—louder, or that distributes the sound to a larger or more distant audience. A sound reinforcement system can simple, such as a small public address (PA) system in a coffeehouse consisting of a single microphone connected to a self-powered 100-watt loudspeaker system, or very complex, such as hundreds of microphones, complex mixing and signal processing systems, tens of thousands of watts of amplification, and multiple loudspeaker arrays, all overseen by a team of audio engineers and technicians (e.g., a famous entertainer or group performing a concert in a large arena or stadium). In both cases, these sound reinforcement systems reinforce sound to make it louder or distribute it to a wider audience.

Normally, when the band sets up, they arrange their instruments and instrument amplifiers on the stage. Once this is set up, they "mic up" which means that microphones and other forms of "input" are placed strategically to pick up the sounds emanating from the instrument amps, drums, vocals, etc., and physically connected to the mixing console. The mixing console has a plurality of audio channels, each dedicated to a single input (instrument, sound source of some kind, etc.). The outputs of the mixing console are routed to (typically) stereo channels, which are then sent to an amplification system. This mixing board, also known as a "soundboard," is wired to either power amplifiers which are then wired to speakers, or "powered" speakers which have built in amplification that are generally pointed away from the stage and towards the audience.

At the same time, on the stage, a plurality of wires bundled together and terminated with an input box provides localized input for microphone cables and other sound sources. This device is commonly referred to as a "snake." The snake is then routed to the mixing board, and each wire on the snake is plugged into the "input" of the corresponding channel on the board. In essence, the snake provides remote input jacks for the board. The setup process can be extensive and quite time consuming, depending upon the complexity of the gear and size of the show. Numerous cables must be removed from storage containers ("road cases"), uncoiled, and connected to the various pieces. Furthermore, at the conclusion of the show, all of this must be "broken down." Despite improvements such as digital/analog conversion, these configurations are basically the same as it has been for 50 years or more, and are costly and time consuming to set up and "tear" down, as most musicians and "roadies" will explain. For example, the setup and teardown on large complex shows can cost into the tens of thousands, and sometimes a lot more. Much of this is due to extensive cabling that must be run.

A wireless musical instrument transmitter and receiver, such as a wireless microphone, is a microphone or "body pack" without a physical cable connecting it directly to the sound recording or amplifying equipment with which it is associated. The musician generally plugs the body pack into the instrument via an analog cord that accepts the signal from the electric device (such as a guitar). As the musician plays the instrument, the signal is transmitted to the receiver, which is then plugged into, for example, the musician's guitar amplifier. Typically these systems utilize UHF or VHF frequencies, and have recently started to integrate audio/digital and digital/audio converters (ADC/DAC). ADC/DAC encodes the analog sound to digital signals before transmitting them to the receiver where they are then converted back to analog signals before being output. However, these wireless systems are subject to RF interference, tend to be unreliable and provide lower quality than wired systems. Other limitations include range limitations, latency, limitations on the number of wireless devices at a performance, etc.

As a result, there is a need for a wireless entertainment system that eliminates the complex cabling required in large sound reinforcement systems while preserving the quality and low latency requirements demanded by performers and their audiences.

SUMMARY OF THE INVENTION

The present invention provides a wireless entertainment system that eliminates the complex cabling required in large sound reinforcement systems while preserving the quality and low latency requirements demanded by performers and their audiences.

More specifically, the present invention provides a method for configuring a wireless sound reinforcement system by detecting a controller and two or more wireless adapters using an electronic device. The controller has a plurality of input channels and output channels. Each wireless adapter is associated with an entertainment device. Channel information about each input channel and output channel is obtained from the controller. Device information is obtained from each entertainment device via the wireless adapter. A network address is assigned to each input channel of the controller, each output channel of the controller and each wireless adapter. Each entertainment device is mapped to at least one of the input channels and/or output channels of the controller. The device information and the channel mappings for the entertainment devices are provided to the controller. The foregoing method can be implemented as a computer program embodied on a non-transitory computer readable medium for execution by a computer or processor such that the steps are implemented as one or more code segments.

In addition, the present invention provides a wireless sound reinforcement device that includes a wireless transceiver, a network interface, a memory, and a processor communicably coupled to the wireless transceiver, the network interface and the memory. The processor: (a) detects a controller via the network interface and two or more wireless adapters via the wireless transceiver, wherein the controller has a plurality of input channels and output channels and each wireless adapter is associated with an entertainment device, (b) obtains a channel information about each input channel and output channel from the controller, (c) obtains a device information from each entertainment device via the wireless adapter, (d) assigns a network address to each input channel of the controller, each output channel of the controller and each wireless adapter, (e) maps each entertainment device to at least one of the input channels and/or output channels of the controller, and (f) provides the device information and the channel mappings for the entertainment devices to the controller.

Moreover, the present invention provides a sound reinforcement system that includes two or more entertainment devices, a controller and an electronic device. Each entertainment device has a wireless adapter. The controller has a plurality of input channels and output channels. The electronic device has a wireless transceiver, a network interface, a memory, and a processor communicably coupled to the wireless transceiver, the network interface and the memory. The network interface is communicably coupled to the controller. The wireless adapter of each entertainment device is communicably coupled to the wireless transceiver. The processor: (a) detects the controller and the wireless adapters, (b) obtains a channel information about each input channel and output channel from the controller, (c) obtains a device information from each entertainment device via the wireless adapter, (d) assigns a network address to each input channel of the controller, each output channel of the controller and each wireless adapter, (e) maps each entertainment device to at least one of the input channels and/or output channels of the controller, and (f) provides the device information and the channel mappings for the entertainment devices to the controller.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to sound reinforcement systems, but it will be understood that the concepts of the present invention are applicable to any type of entertainment system.

The present invention provides a system and technology platform referred to as "WiDi" (Wireless Instrument Digital Interface). Broadly speaking, the present invention turns musical instruments into streaming Internet Protocol ("IP") enabled instruments that communicate with a router, which can be, separate or integrated into a soundboard. Note that one skilled in the art can adapt the present invention to work with other communication protocols existing now or developed in the future. Using the present invention, an entire orchestra could be wireless!

Figure 1:
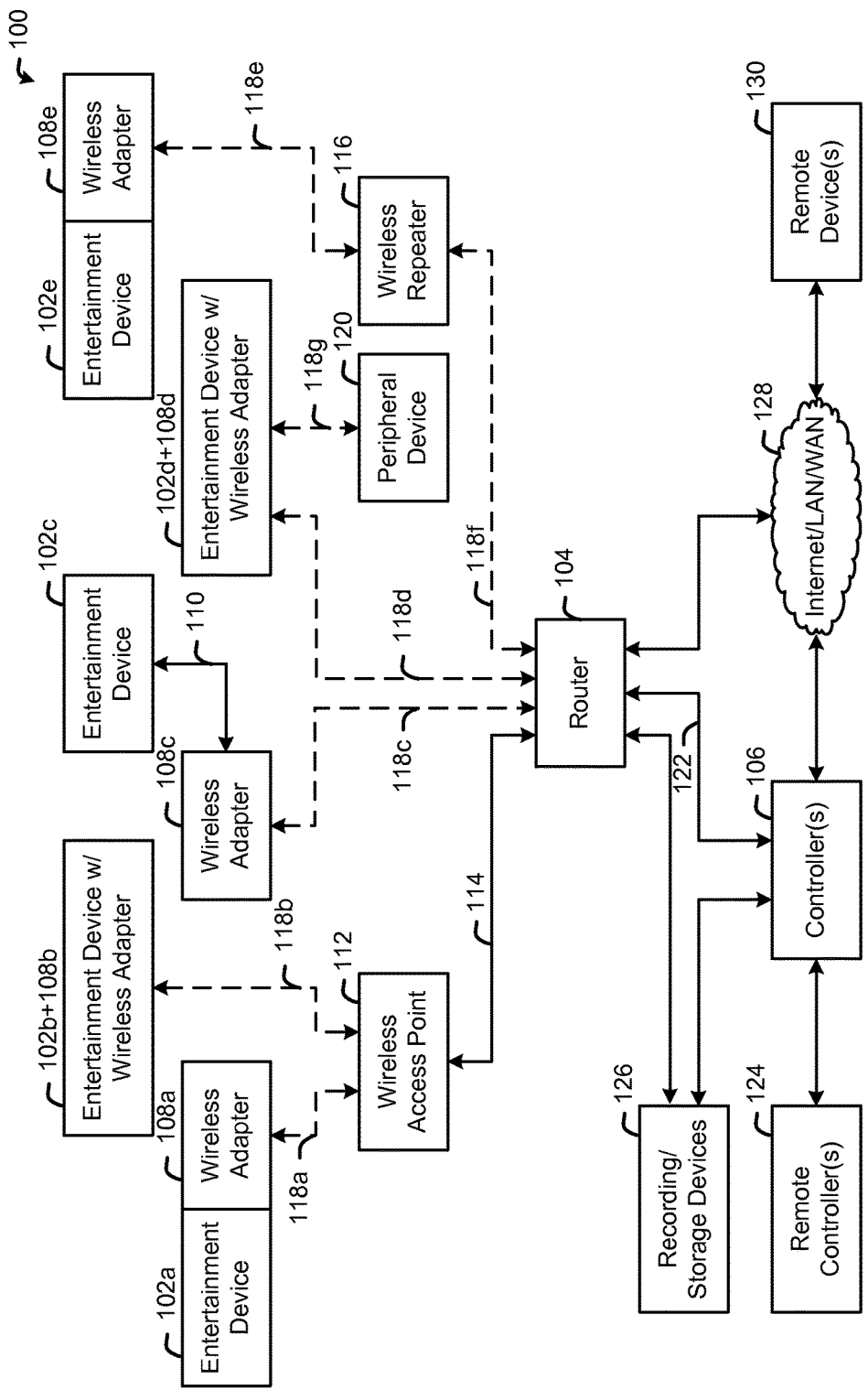
FIG. 1 is a block diagram of a wireless sound reinforcement system in accordance with one embodiment of the present invention.

Now referring to FIG. 1, a block diagram of a wireless sound reinforcement system in accordance with one embodiment of the present invention is shown. The wireless sound reinforcement system 100 includes two or more entertainment devices 102, a router 104 and a controller 106. The entertainment devices 102 can be a microphone (e.g., 102d), a speaker (e.g., 102a and 102e), a display, a headset, an earpiece, a musical instrument (e.g., 102b—guitar; 102c—drum set), an amplifier, a body pack, a foot pedal, a recording device, a teleprompter, a monitor, a display screen, a projector, a television, a light, a lighting system, a laser, a smoke machine, a pyrotechnics device, a platform or stage moving device, an audio device, a video device, an audio/video device, an audio effects device, a visual effects device or a combination thereof. Each entertainment device 102 has a network adapter 108 that is integrated into the entertainment device 102 (e.g., 102b/108b and 102d/108d), attached to the entertainment device 102 (e.g., 102a/108a and 102e/108e), or connected to the entertainment device 102 (e.g., 102c/108c) with a cable 110. The router 104 will be described in more detail below. The controller 106 can be a computer, a mixer, a soundboard, a recording console, an event audio/visual control panel(s) or other suitable device to control a performance of the two or more entertainment devices 102. The controller 106 has a plurality of input channels and output channels. The controller 106 can be an "off-the-shelf" device or a controller that is specifically designed to interface with the router 104 of the present invention. The system 100 may also include one or more access points 112 communicably coupled between the wireless adapters 108a, 108b of the entertainment devices 102a, 102b and a network interface (not shown) of the router 104 via a cable 114, or one or more wireless repeaters 116 communicably coupled between the wireless adapters 108e of the entertainment devices 102e and a transceiver (not shown) of the router. The dashed lines indicate wireless communication links 118. Note that entertainment devices 102 may also be connected to the router 104 using cables. The wireless adapters 108 may also communicate with one or more peripheral devices 120 (e.g., 108*d*/120) via wireless communication links 118 (e.g., 118*g*) or cables (not shown). The one or more peripheral devices 120 can be a microphone, a display, a headset, an earpiece, an amplifier, a body pack, a foot pedal, a teleprompter, a monitor, a display screen or other suitable device. Note that the wireless adapter 108 can communicate with the router 104 using a first communication protocol (e.g., IEEE 802.11, etc.) and the one or more peripheral devices 120 using a second communication protocol (e.g., Bluetooth, etc.).

The network interface (not shown) of the router 104 is communicably coupled to the controller 106 via one or more cables 122. Cables 122 can be single or multiple optical, Ethernet or other suitable communication cable. Note that integrating the router 104 into the controller 106 can eliminate cables 122. Moreover, the controller 106 can be configured such that the router 104 plugs into a router interface of the controller 106. One or more remote controllers 124 may be communicably coupled to the controller 106 or the router 104. The remote controller(s) 124 can be a handheld computer, a mobile computing device, a mobile phone, a handheld tablet, a laptop or a combination thereof. The remote controllers 124 can be used to monitor the performance and communicate with controller 106 or change one or more parameters based on information detected, measured or obtained from areas away from the controller 106 (e.g., backstage, rafters, top row, etc.). In addition, one or more recording or data storage devices 126 can be communicably coupled to the router 104 or controller 106 to record the performance of the entertainment devices 102, operational data, logs, diagnostics or other desirable data. The router 104 or controller 106 may also have sufficient data storage capacity to record such information. The router 104 and/or the controller 106 may also be connected to another network 128 (e.g., Internet, LAN, WAN, etc.) such that the performance can be transmitted, broadcast or recorded by one or more remote devices 130.

Figure 2:
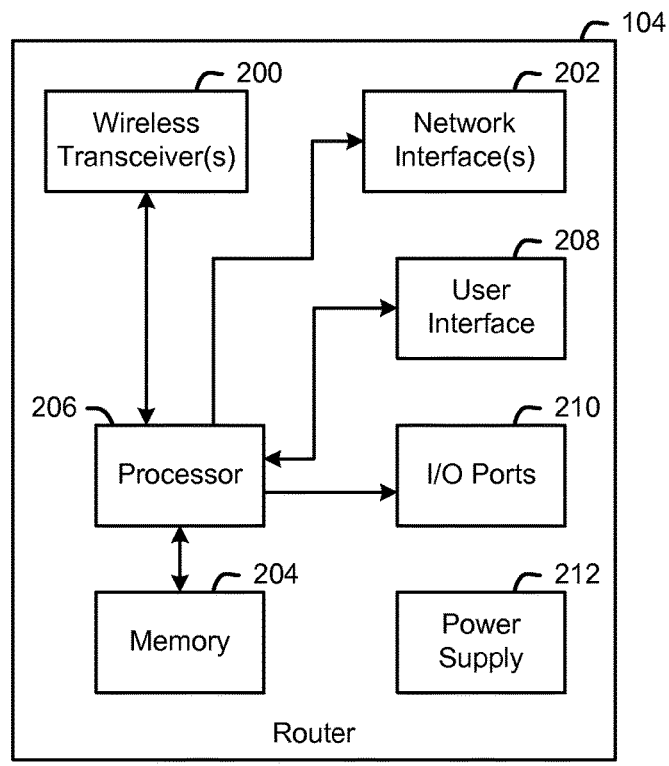
FIG. 2 is a block diagram of a wireless sound reinforcement router for an entertainment device in accordance with one embodiment of the present invention.

Referring now to FIG. 2, a block diagram of a wireless sound reinforcement router 104 in accordance with one embodiment of the present invention is shown. Router 104 includes one or more wireless transceivers 200, a network interface 202, a memory 204, and a processor 206. The processor 206 is communicably coupled to the wireless transceiver 200, the network interface 202 and the memory 204. The router 104 may also include a user interface 208, one or more input/output (I/O) ports or connectors 210, a power supply 214 and various other components as will be appreciated by those skilled in the art. The router 104 may also be communicably coupled to a network switch or integrated with the network switch. The router 104 provides bidirectional communications using two or more communication channels between the controller 106 and the entertainment devices 102 via the wireless adapters 108. Note that wired entertainment devices 102 can be connected to the router 104 via the network interface 202 or an addressable I/O port 210. The network interface 202 can also be used to connect to another internal or external network.

Figure 3:
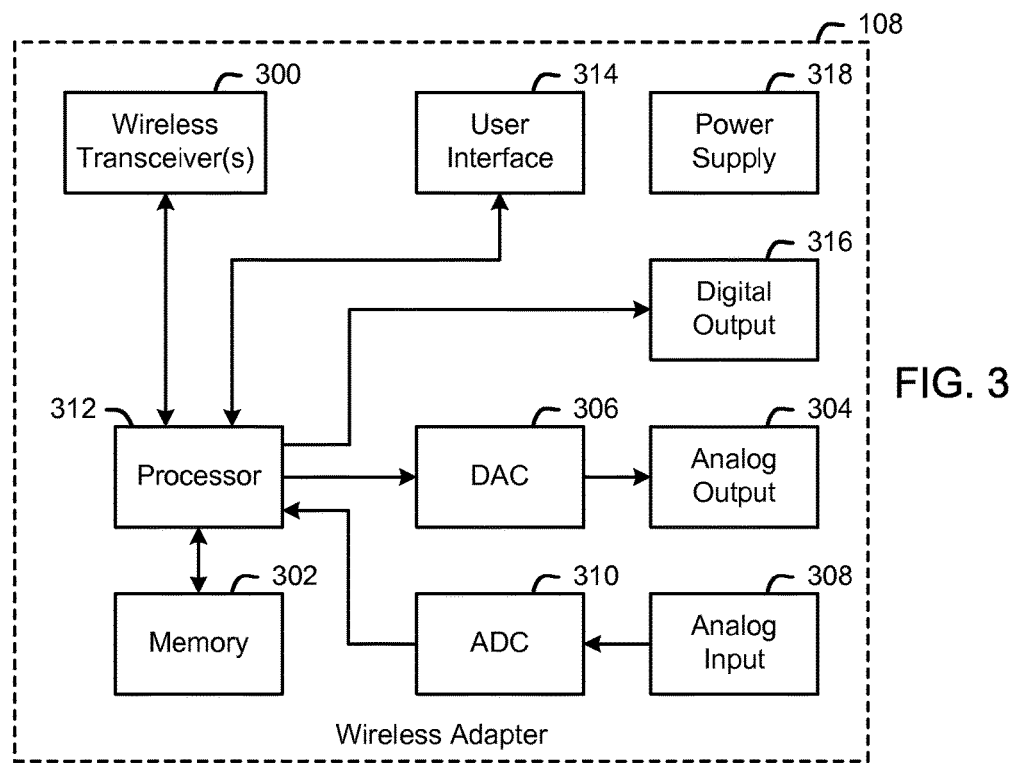
FIG. 3 is a block diagram of a wireless adapter in accordance with one embodiment of the present invention.

Now referring to FIG. 3, a block diagram of a wireless adapter 108 in accordance with one embodiment of the present invention is shown. The wireless adapter 108 includes a wireless transceiver 300, a memory 302, an analog output 304, a digital-to-analog converter ("DAC") 306 communicably coupled to the analog output 304, an analog input 308, an analog-to-digital converter ("ADC") 310 communicably coupled to the analog input 308 and a processor 312 communicably coupled to the wireless transceiver 300, the memory 302, the digital-to-analog converter 306 and the analog-to-digital converter 310. The wireless adapter 108 may also include a user interface 314 communicably coupled to the processor 312, a digital output 316 communicably coupled to the processor 312, and a power supply 318. Note that the digital-to-analog converter 306 and the analog-to-digital converter 310 can be integrated into the processor 312. Other components can be used.

In one simplified example, the wireless adapter 108 is a wireless body pack that contains two primary components: (1) a radio transceiver 302, which uses one or more of the IEEE 802.x WiFi Internet standards; and (2) an analog-to-digital converter 310. In addition, it contains two or more bi-directional data channels, which enables the device to "communicate" much like a computer. So for example the same body pack that is transmitting the digital guitar audio could also receive a monitor mix that is being sent from the router/sound console. One chipset that can be used is STS Wireless's fourth-generation wireless chip, which delivers audio up to 150 feet throughout a house or up to 500 feet outdoors. Longer range is available with a wireless repeater. It supports up to eight simultaneous channels of uncompressed 96 kHz/24-bit CD-quality audio, and its bidirectional feature allows for use in VoIP devices.

The transceiver 300 can be programmed or set to operate in a receive-only mode, transmit-only mode or a normal mode. The normal mode (transmit and receive) will generally be preferable. The ADC 310 converts analog audio signals through the analog input 308 into digital signals. The DAC 306 converts digital signals, such as the previously digitized audio signal, or messages, commands, instructions or other information into analog signals. The digitized audio signal, or messages, commands, instructions or other information may also be provided to the digital output 316. The processor 312 with firmware handles the processing of encapsulating the digital audio into "packets" suitable for routing on the network. Think of the transceiver unit as a self-contained miniature computer whose express function is to provide input and output.

The device 108, through firmware and a simple hardware user interface with visual display, is programmed with a TCP/IP address to identify and connect it to the network, either manually or through DHCP. The transceiver is tied to the DA converter. This is a standard chipset (described above) that converts an analog signal into digital audio, of which there are several commercially available to choose from. Through the circuit board, converted data is encapsulated into packets for streaming over the network. The packets are then further encapsulated into TCP/IP packets which are then transmitted wirelessly via the radio transceiver 300.

Simultaneous to packets being sent outbound, the device also has two-to four or more data channels where the device may receive information for further processing. This can include for example, teleprompter, MIDI (music instrument digital interface, for controlling midi-compliant devices), digital audio monitors (for wireless monitoring of audio instead of floor monitors), etc. The transceiver unit itself may be embedded or integrated directly into the device it is processing, or it may be worn as described, above, as a bodypack. For example, it may be completely encased in custom designed speakers, guitars, mics, amplifiers, pedal boards, and numerous other devices.

Figure 4:
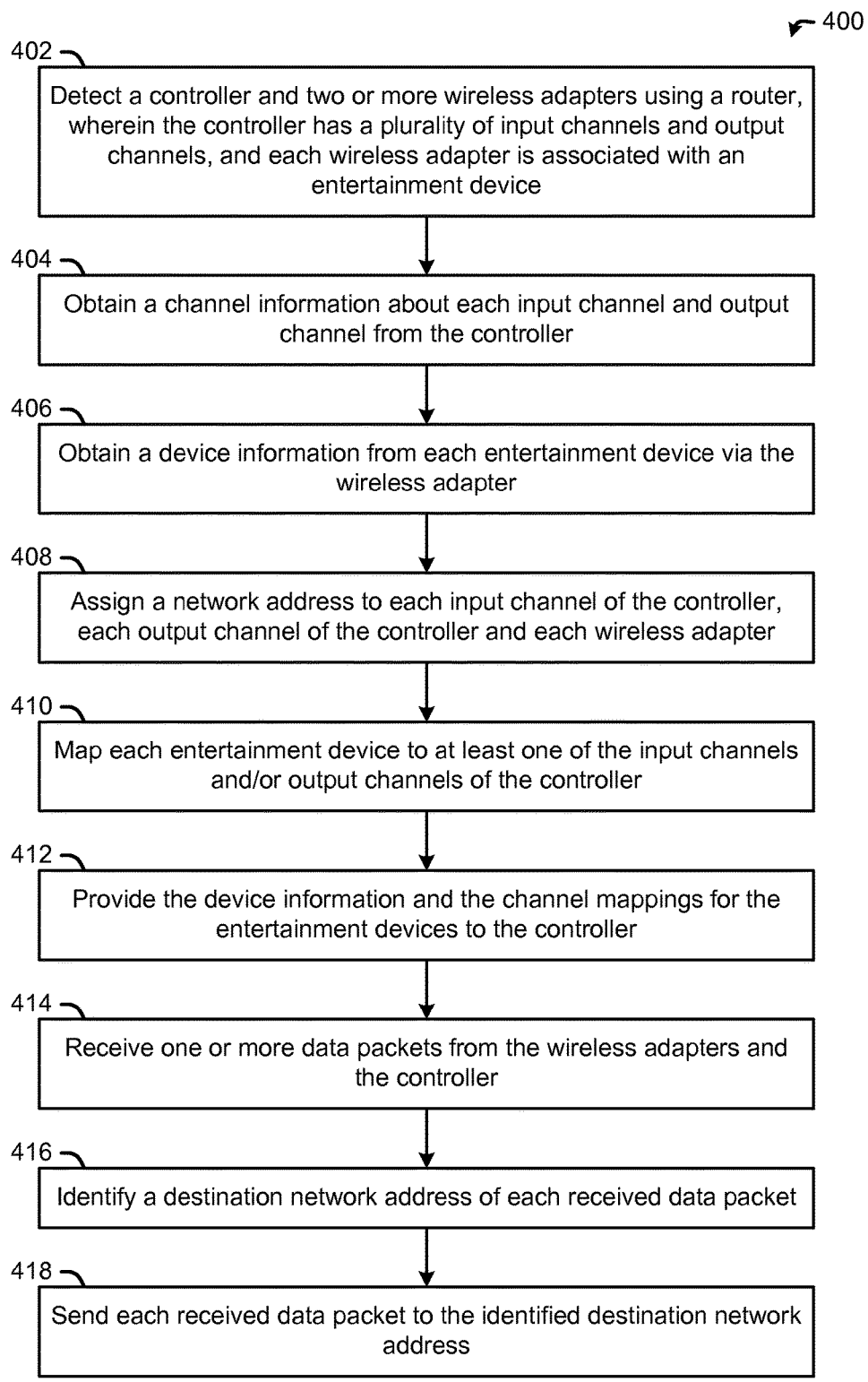
FIG. 4 is a flow chart of a method for configuring a wireless sound reinforcement system in accordance with one embodiment of the present invention.

Referring now to FIG. 4, a flow chart of a method 400 for configuring a wireless sound reinforcement system in accordance with one embodiment of the present invention is shown. Also referring to FIGS. 1 and 2, the processor 206 detects the controller 106 and the wireless adapters 108 in block 402. Channel information about each input channel and output channel is obtained from the controller 106 in block 404. Device information is obtained from each entertainment device 102 via the wireless adapter 108 in block 406. The processor 206 assigns a network address to each input channel of the controller 106, each output channel of the controller 106 and each wireless adapter 108 in block 408 and maps each entertainment device 102 to at least one of the input channels and/or output channels of the controller 106 in block 410. The device information and the channel mappings for the entertainment devices 102 are provided to the controller 106 in block 412. Thereafter, the processor 206 receives one or more data packets from the wireless adapters 108 and the controller 106 in block 414, identifies a destination network address of each received data packet in block 416, and sends each received data packet to the identified destination network address in block 418. Note that the data packets can be encrypted and/or compressed. Moreover, the router 104 may include a firewall or other security features to prevent unauthorized access to the router 104, controller 106, wireless adapters 108 or entertainment devices 102. The foregoing steps can be all performed automatically without any user input. Alternatively, a setup program can be run that guides a user through accepting, changing or rejecting the device information and/or the channel mappings via the user interface 208 of the router 104 or the controller 106. The user interface 208 of the router 104 or the controller 106 can also be used to make one or more modifications to the device information and/or the channel mappings. The foregoing method can be implemented as a computer program embodied on a non-transitory computer readable medium for execution by a computer or processor such that the steps are implemented as one or more code segments.

The router 104 is integrated with digital audio components to convert and route digital audio packets through to their destinations. In one example, when router 104 is turned on, it is configured to automatically assign network (e.g., Internet Protocol) addresses to entertainment devices 102a, 102b, 102c, 102d, 102e and 106 through an integrated web server (built into the device). For example, the IP address assignments can be:

| | |
|---|---|
| Left speaker 102a | 192.168.1.10 |
| Right speaker 102e | 192.168.1.11 |
| router 104 | 192.168.1.1 (gateway) |
| Soundboard 106 | 192.168.1.2 |
| Microphone 102d | 192.168.1.12 |
| Drum set 102c | 192.168.1.13 |
| Guitar and amplifier 102b | 192.168.1.14 |

Simultaneously, the router 104 maps the IP addresses to channels on the soundboard 106. If the router 104 is already on and a given device is turned on, for example a wireless body pack attached to a guitar, the router 104 automatically detects the device and assigns an IP address to the device using industry-standard DHCP (served through the router). When the link is made, the router 104 automatically determines what the device is and assigns it a channel. In addition, the router can provide device information, such as the device name (e.g., "Zach's Guitar"), to the soundboard 106 for display on the channel listing. The router 104 employs packet switching technology to reduce or eliminate "packet collisions" and therefore delivers near zero latency performance. Quality of Service ("QoS") and packet prioritization can also be used. The router 104 eliminates the need for complex cabling, and enables numerous benefits such as audio channel auto-assignment, bi-directional data transfer, and more. For example, a performer could have a small screen on his guitar with lyrics or tab, or the system could route information and music to in-ear monitors using the same device.

The router 104 and wireless adapters 108 connected to the entertainment devices 102 can employ any known or future wireless digital communication standard, such as 802.11, Bluetooth, WiGig, etc. In this manner, numerous devices may be turned on and assigned "channels". These devices would be interference free because they are 100% digital. This also includes powered speakers, so that a wireless signal may be sent and no wires would need to be run. The present invention provides the capability to route wireless instrument traffic over any network architecture. Moreover, the router 104 can employ multiple frequencies, protocols, and sophisticated frequency and time domain techniques to eliminate or reduce interference and packet collisions. The system 100 is modular in that it is designed to be transportable across multiple wireless packet-based technologies or frequencies in the event a next generation communications platform is developed.

For example, let's say we have a guitar that has uses the present invention, and a mixing console that has a built-in wireless instrument digital router (router 106). The player switches on his guitar pack. It automatically gets a TCP/IP address from the "router" (which is the mixing console). The console assigns the player a channel, and his name (hostname) appears in the display of the channel. Presto! No snake (multi-channel wire that goes from stage to console)! Further implications include memory settings in the console for that instrument, etc.

In another example, when "Joe the guitar player" turns on his rig, the mixing console/router automatically "syncs" with his guitar, recognizes it through bi-direction communication, and automatically assigns a channel on the console to his guitar. As the sound engineer—the guy who makes it sound good live—watches his console, up pops "Joe's guitar" on a channel strip—requiring no further setup. At the same time, as the large powered public address ("PA") speakers are set up and turned on, these also automatically sync to the board, and require no wires other than the AC power required to run them.

Take it from there, and imagine an entire band that is wireless, including not only the instruments, but also the speakers. All of a sudden, you now have a solution to the age-old problem of PAs with wires. Take it further and you have the ability to digitally lay tracks anywhere in the world with nominal issues. Of course, the present invention will accept "wired" instruments through the console, but these connections can be digital instead of analog.

Generally speaking, a wireless router is a network device that routes IP traffic across several wireless IP networks and wired networks, utilizing the 802.11x wireless standard ("WiFi technology"). Wireless routers are used to build independent WLANs that can communicate with each other and the Internet. Some access points can function either as a wireless gateway or wireless router, while other devices function solely as a wireless router. Devices communicate with the router via a wireless network adapter that is either built into the device, or utilizes one of the devices available PCI slots or USB ports. A typical wireless router is capable of routing Internet traffic to 254 unique private IP addresses using IPv4, and can automatically assign IP addresses to these devices (or they can be manually assigned).

Packets of data from one computer system are sent to another computer system using the IP addresses of each device. Additionally, each device has a "MAC" address, which is the physical ID of the actual interface. Every device that communicates on the Internet or Intranet (usually a private "firewalled" network) has an IP address. Essentially, a wireless device, such as a wireless Internet card, is a transceiver, which means it is a radio that sends and receives signals, much like a walkie-talkie (but more sophisticated).

The router 104 would also contain "wired" connections that would be standard Gigabit Ethernet ports. These ports would allow the user to connect other devices such as light controllers, power amps, etc., ALL of which could be WiDi enabled. Additionally, the router would have the capability to uplink to the web, creating an instant method for aggregating digital music, potentially mixing it, and delivering it simultaneously and remotely to distant destinations. It would also allow incoming connections from musicians who may be elsewhere, and would include compensation algorithms for any latency.

The router 104 may also perform many other functions, such as, configuring the router 104 based on one or more settings and perform one or more diagnostic tests whenever the router is turned on, reset or restarted. In addition, the processor 206 of the router 104 automatically detects (e.g., by scanning for new adapters) a new wireless adapter associated with a new entertainment device, obtains device information from the new entertainment device via the new wireless adapter, assigns a new network address to the new wireless adapter, maps the new entertainment device to at least one of the input channels and/or output channels of the controller 106, provides the device information and the channel mapping for the new entertainment device to the controller 106. The router 104 can also be used to change one or more characteristics of at least one of the entertainment devices 102 using the controller 106. The one or more characteristics may include a delay, a reverberation, an amplification, a pitch, a tuning, or other adjustable or programmable aspect of the entertainment device 102. The device information and the channel mappings for the entertainment devices 102 can be saved locally or remotely. Moreover, a program can be used to control at least one of the entertainment devices 102. In addition, one or more diagnostics can be performed on at least one of the entertainment devices 102 using the controller 106.

An example will now be described. In a typical wired world, a four-piece band—consisting of drums, bass, guitar and vocals—would amplify their instruments through a PA system. This system—which as described above is typically called "sound reinforcement," allows the band to amplify and "mix" their sound. This can be for anything from a large arena to a small club. The typical gear involved in this kind of setup—including the instruments—would be: Guitar and amplifier; Bass and amplifier; Microphone for vocals; Microphones for amps; Microphones for drums; Mixing console (sometimes called a "mixing board"); Outboard effects processing devices; PA Amplifiers; and Left and Right PA speakers.

In a WiDi configuration in accordance with one embodiment of the present invention, the standard mixing console, for example, would be replaced by a WiDi enabled integrated mixing console and digital WiDi router; all input devices would be fitted (or equipped) with WiDi tranceivers, as well as speakers and amps. The devices themselves would be either hard-coded with IP addresses or would work with DHCP, served up from the console/router. As each component comes up, pre-programmed channels sync with the instrument and all previously stored information is retrieved for quick setup. When a device is played or mic is used, the signal is routed wirelessly through the console/router, to the speakers, where the sound is amplified for the audience. This system eliminates most, if all, wires necessary to provide sound reinforcement.

Another scenario could involve a traveling band with limited production walking into a big venue. The big venue could have some type of Widi router installed permanently, and the band could have a similar unit that would "sync" to it. This would allow quick configuration when in fact the band is not carrying the complete system, and/or the venue does not have an installed system. This saves time and provides consistency, security and reliability in that a Band's settings will remain the same. In addition, big equipment suppliers, such as Éclair, rent out their gear for large venues, so the band can have a component that seamlessly plugs into the rented gear and saves and uploads one or more performance configurations specifically setup for the band.

The router/controllers can be manually configured such that configurations, scenes, event ambiance or other aspects of a performance can be programmed, stored and recalled. This is a pretty standard feature in today's consoles, and likewise we should have it too. Not only are the router and controller programmable; the router and/or controller or storage media can retain the network addresses of the wireless adapters associated with the entertainment devices, and the device information for the entertainment devices so that next time you can just pull up the band name "Journey" and the settings would reappear. For example, the band "Journey" could have a base profile for a tour, a base profile for an event location, a profile that is specific to the tour and the event location, or any other desirable profile. The system can "record" configurations settings as they are set or changed, such that the configuration settings can be stored and replayed. Moreover, an application programming interface or other program can be used to assist in the setting up and operation of the present invention. The system will also "plug-and-play" with industry standard plug-ins, devices and software, such ProTools and Logic Pro.

The ability of the router 104 to connect to the Internet creates an instant method for aggregating digital music, potentially mixing it, and delivering it simultaneously and remotely to distant destinations. It also allows incoming connections from musicians who may be elsewhere geographically, and would include compensation algorithms for latency.

Figure 5:
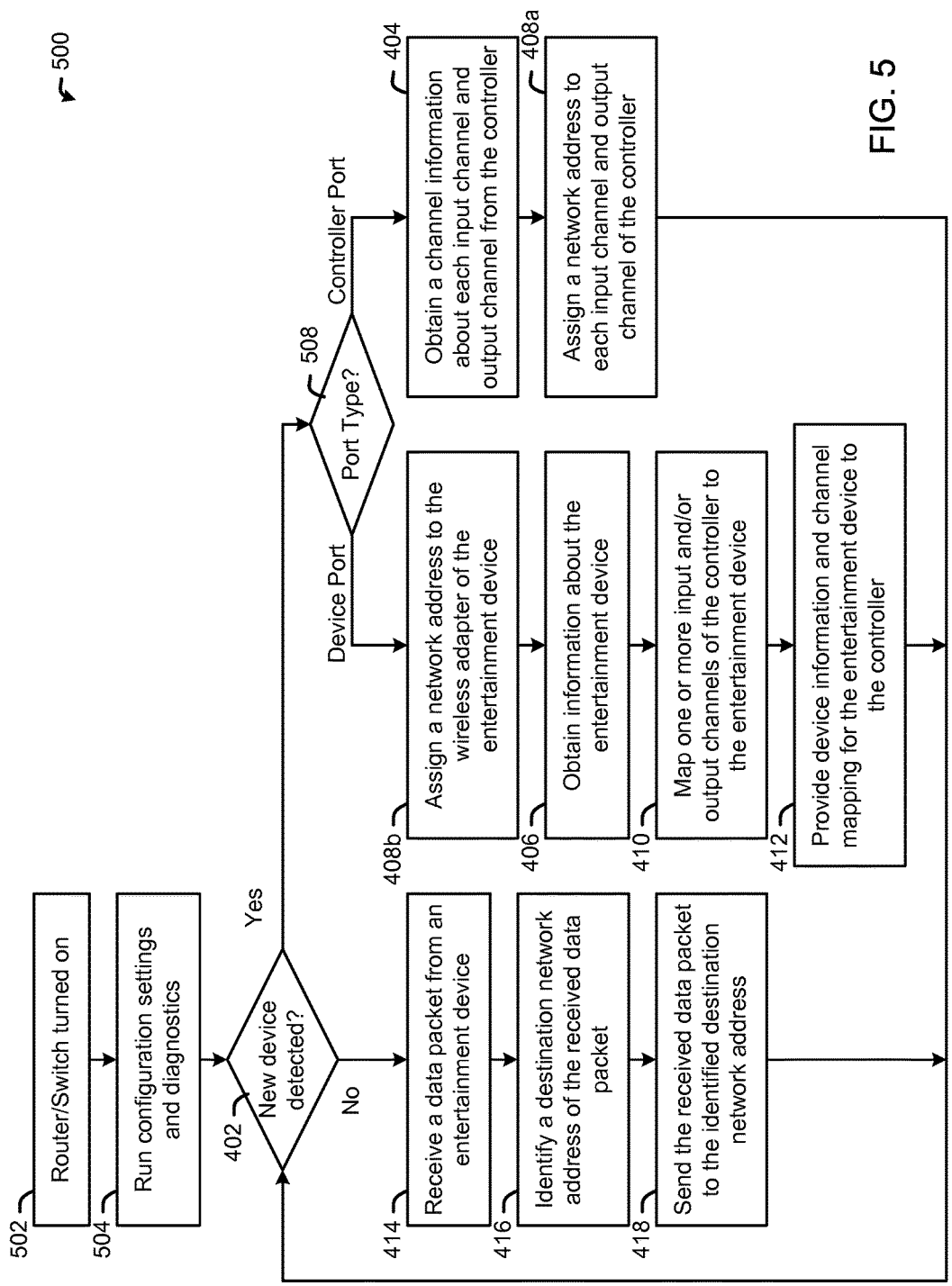
FIG. 5 is a flow chart of a method for configuring a wireless sound reinforcement system in accordance with another embodiment of the present invention.

Now referring to FIG. 5, a flow chart of a method 500 for configuring a wireless sound reinforcement system in accordance with another embodiment of the present invention is shown. The router/switch is turned on in block 502 and one or more configuration settings and diagnostics are run in block 504. If a new device is detected, as determined in decision block 402, and the port type is a controller port, as determined in decision block 508, channel information about each input channel and output channel is obtained from the controller in block 404, and a network address is assigned to each input channel of the controller and each output channel of the controller in block 308a. Thereafter, the process returns to decision block 402. If, however, the port type is a device port, as determined in decision block 508, a network address is assigned to each wireless adapter in block 408b, and device information is obtained from each entertainment device via the wireless adapter in block 406. Each entertainment device is mapped to at least one of the input channels and/or output channels of the controller in block 410. The device information and the channel mappings for the entertainment devices are provided to the controller in block 412. Thereafter, the process returns to decision block 402. If, however, no new device is detected, as determined in decision block 402, one or more data packets are received from the wireless adapters and/or the controller in block 414, a destination network address of each received data packet is identified in block 416, and each received data packet is sent to the identified destination network address in block 418. Thereafter, the process returns to decision block 402. Note that the data packets can be encrypted and/or compressed. The foregoing method can be implemented as a computer program embodied on a non-transitory computer readable medium for execution by a computer or processor such that the steps are implemented as one or more code segments.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for configuring a sound reinforcement system comprising the steps of;
    detecting a controller and two or more wireless adapters using an electronic device, wherein the controller has a plurality of input channels and output channels, and each wireless adapter is associated with an entertainment device;
    for each detected controller, obtaining a channel information about each input channel and output channel from the controller, and assigning a first network address to each input channel and each output channel of the controller; and
    for each detected wireless adapter, assingning a second network address to each wireless adapter, obtaining a device information from each entertainment device via the wireless adapter, mapping each entertainment device to at least one of the input channels and/or output channels of the controller, and providing the device information and the channel mappings for the entertainment devices to the controller.

2. The method as recited in claim 1, further comprising the step of receiving one or more modifications to the device information and/or the channel mappings from a user interface communicably coupled to the electronic device or the controller.

3. The method as recited in claim 1, further comprising the step of running a setup program that guides a user through accepting, changing or rejecting the device information and/or the channel mappings via a user interface communicably coupled to the electronic device or the controller.

4. The method as recited in claim 1, further comprising the steps of detecting a new wireless adapter associated with a new entertainment device, obtaining the device information from the new entertainment device via the new wireless adapter, assigning an new address to the new wireless adapter, mapping the new entertainment device to at least one of the input channels and/or output channels of the controller, and providing the device information and the channel mapping for the new entertainment device to the controller.

5. The method as recited in claim 1, further comprising the step of changing one or more characteristics of at least one of the entertainment devices using the controller.

6. The method as recited in claim 1, further comprising the steps of:
    receiving one or more data packets from the wireless adapter(s), the controller or both;
    identifying a destination network address of each recieved data packet; and
    sending each received data packet to the identified network address.

7. A wireless sound reinforcement device comprising:
    a wireless transceiver;
    a network interface;
    a memory; and
    a processor communicably coupled to the wireless transceiver, the network interface and the memory, wherein the processor: (a) detects a controller via the network interface and two or more wireless adapters via the wireless transceiver, wherein the controller has a plurality of input channels and output channels and each wireless adapter is associated with an entertainment device, (b) for each detected controller, (i) obtains a channel information about each input channel and output channel from the controller, and (ii) assigns a first network address to each input channel and each output channel of the controller, and (c) for each detected wireless adapter, (i) assigns a second network address to each wireless adapter, (ii) obtains a device information from each entertainment device via the wireless adapter, (iii) maps each entertainment device to at least one of the input channels and/or output channels of the controller, and (iv) provides the device information and the channel mappings for the entertainment devices to the controller.

8. The wireless sound reinforcement device as recited in claim 7, wherein the processor further runs a setup program that guides a user through accepting, changing or rejecting the device information and/or the channel mappings via a user interface communicably coupled to the electronic device or the controller.

9. The wireless sound reinforcement device as recited in claim 7, wherein the processor further detects a new wireless adapter associated with a new entertainment device, obtains the device information from the new entertainment device via the new wireless adapter, assigns an new address to the new wireless adapter, maps the new entertaimnent device to at least one of the input channels and/or output channels of the controller, and provides the device information and the channel mapping for the new entertainment device to the controller.

10. The wireless sound reinforcement device as recited in claim 7, wherein the processor further changes one or more characteristics of at least one of the entertainment devices using the controller.

11. The wireless sound reinforcement device as recited in claim 7, wherein the processor further receives one or more data packets from the wireless adapter(s), the controller or both, identifies a destination network address of each received data pachet, and sends each received data packet to the identified network address.

12. A wireless sound reinforcement system comprising:
two or more entertainment devices, each entertainment device having a wireless adapter;
a controller having a phirality of input channels and output channels; and
an electronic device comprising a wireless transceiver, a network interface, a memory and a processor communicably coupled to the wireless transceiver, the network interface and the memory, wherein; (1) the network interface is communicably coupled to the controller, (2) the wireless adapter of each entertainment device is communicably coupled to the wireless transceiver, and (3) the processor; (a) detects the controller and the wireless adapters, (b) for each detected controller, (i) obtains a channel information about each input channel and output channel from the controller, and (ii) assigns a first network address to each input channel and each output channel of the controller, and (c) for each detected wireless adapter, (i) assigns a second network address to each wireless adapter,(ii) obtains a device information from each entertainment device via the wireless adapter, (iii) maps each entertainment device to at least one of the input channels and/or output channels of the controller, and (iv) provides the device information and the channel mappings for the entertainment devices to the controller.

13. The wireless sound reinforcement systein as recited in claim 12, wherein the processor further runs a setup program that guides a user through accepting, changing or rejecting the device information and/or the channel mappings via a user interface communicably coupled to the electronic device or the controller.

14. The wireless sound reinforcement system as recited in claim 12, wherein the processor further detects a new wireless adapter associated with a new entertainment device, obtains the device information from the new entertaimnent device via the new wireless adapter, assigns an new address to the new wireless adapter, maps the new entertainment device to at least one of the input channels and/or output channels of the controller, and provides the device information and the channel mapping for the new entertainment device to the controller.

15. The wireless sound reinforcement system as recited in claim 12, wherein the processor further changes one or more characteristics of at least one of the entertainment devices using the controller.

16. The wireless sound reinforcement system as recited in claim 12, wherein the processor further receives one or more data packets from the wireless adapter(s), the controller or both, identifies a destination network address of each received data packet, and sends each received data packet to the identified network address.

* * * * *